(12) United States Patent
Shin

(10) Patent No.: US 11,592,666 B2
(45) Date of Patent: Feb. 28, 2023

(54) PICTURE GENERATION UNIT FOR HEAD-UP DISPLAY

(71) Applicant: HYUNDAI MOBIS CO., LTD., Seoul (KR)

(72) Inventor: Min Ho Shin, Yongin si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/137,143

(22) Filed: Dec. 29, 2020

(65) Prior Publication Data

US 2022/0043258 A1 Feb. 10, 2022

(30) Foreign Application Priority Data

Aug. 10, 2020 (KR) .................... 10-2020-0099807
Aug. 10, 2020 (KR) .................... 10-2020-0099809

(51) Int. Cl.
*B60K 35/00* (2006.01)
*G02B 27/01* (2006.01)
*G02B 27/30* (2006.01)

(52) U.S. Cl.
CPC .......... *G02B 27/0101* (2013.01); *B60K 35/00* (2013.01); *B60K 2370/1529* (2019.05);
(Continued)

(58) Field of Classification Search
CPC ............................................... G02B 27/0101
See application file for complete search history.

(56) References Cited

U.S. PATENT DOCUMENTS 5,305,045 A * 4/1994 Terada ..................... G02B 7/28
396/61
7,095,562 B1 * 8/2006 Peng .................. G02B 27/0101
359/290

(Continued)

FOREIGN PATENT DOCUMENTS

JP   2006114854   4/2006
JP   2014107028   6/2014
(Continued)

OTHER PUBLICATIONS

Korean Office Action dated Mar. 18, 2022, issued to Korean Patent Application No. 10-2020-0099809.

*Primary Examiner* — Nan-Ying Yang
(74) *Attorney, Agent, or Firm* — H.C. Park & Associates, PLC

(57) ABSTRACT

A picture generation unit (PGU) used in a head-up display (HUD) includes a printed circuit board (PCB) having a plurality of light sources, a display unit disposed in front of the plurality of light sources and configured to form an image to be provided to the HUD, and a housing disposed between the PCB and the display unit and including an internal reflective structure configured to guide optical beams from the plurality of light sources to the display unit and to homogenize a light intensity of the optical beams incident on the display unit, wherein the internal reflective structure includes a plurality of first funnels respectively disposed of corresponding to the plurality of light sources, and a second funnel disposed of as a singular funnel in front of the first funnels in a form encompassing the plurality of first funnels.

17 Claims, 11 Drawing Sheets

(52) U.S. Cl.
CPC ........ *B60K 2370/347* (2019.05); *G02B 27/30* (2013.01); *G02B 2027/013* (2013.01)

(56) References Cited

U.S. PATENT DOCUMENTS

| | | | |
|---|---|---|---|
| 2006/0083281 A1 | 4/2006 | Inoguchi | |
| 2007/0147075 A1* | 6/2007 | Bang | G02F 1/133605 362/609 |
| 2014/0049983 A1* | 2/2014 | Nichol | G02B 6/0018 362/610 |

FOREIGN PATENT DOCUMENTS

| | | |
|---|---|---|
| KR | 10-2013-0071014 | 6/2013 |
| KR | 10-2015-0137723 | 12/2015 |

* cited by examiner

PICTURE GENERATION UNIT FOR HEAD-UP DISPLAY

CROSS-REFERENCE TO RELATED APPLICATIONS

This application claims priority from and the benefit of Korean Patent Application No. 10-2020-0099807, and Korean Patent Application Number 10-2020-0099809, both filed Aug. 10, 2020, which is hereby incorporated by reference for all purposes as if set forth herein.

BACKGROUND

Field

Embodiments relate to a picture generation apparatus for a head-up display (HUD). More particularly, the inventive concepts relate to a HUD picture generation unit, including a double funnel reflector.

DISCUSSION OF THE BACKGROUND The statements in this section merely provide background information related to the inventive concepts and do not necessarily constitute prior art.

HUD is a driving information display device developed for the safe driving of automobile drivers. Driving information is formed into an image in a picture generation unit (PGU), passed through an optical system, and then projected onto the windshield, or a translucent reflective screen disposed inside the vehicle to be provided to the driver. The PGU includes an LCD that forms an image, and a back-light unit (BLU) disposed behind the LCD to project the image to the optical system inside the HUD.

The HUD needs to be able to provide an image at a level that the driver can identify even in a daylight environment where the front of the vehicle is very bright. The image formed on the LCD is enlarged through an optical system and then projected onto the windshield or a translucent reflective screen. The brightness of the final projected optical image decreases than that of the optical image on the LCD. Therefore, compared to a general display, the BLU for HUD needs to provide an extremely high light intensity.

In general, the BLU for HUD may include a plurality of light-emitting diodes (LEDs) to provide high light intensity.

The above information disclosed in this Background section is only for enhancement of understanding of the background of the invention and, therefore, it may contain information that does not constitute prior art.

SUMMARY

Exemplary embodiments of the present invention provide a picture generation unit (PGU), including a printed circuit board, a display unit, and a housing. The printed circuit board includes a plurality of light sources. The display unit is disposed in front of the plurality of light sources and configured to form an image to be provided to the HUD. The housing is disposed between the printed circuit board and the display unit and includes an internal reflective structure configured to guide optical beams from the plurality of light sources to the display unit and to homogenize a light intensity of the optical beams incident on the display unit. The internal reflective structure includes a plurality of first funnels, respectively disposed corresponding to the plurality of light sources, and a second funnel disposed of as a singular funnel in front of the first funnels in a form encompassing the plurality of first funnels.

The housing may be manufactured by injection molding using a plastic material dispersed with titanium dioxide ($TiO_2$) microparticles.

The internal reflective structure may have a light reflectance of 60% or more.

The internal reflective structure may have specular reflection characteristics and diffuse reflection characteristics, which are controlled based on a size and a content rate of the $TiO_2$ microparticles included in the internal reflective structure.

The size of the $TiO_2$ microparticles configured to provide the specular reflection characteristics to the internal reflective structure may be in a range of 200 nm to 300 nm.

The size of the $TiO_2$ microparticles configured to provide the diffuse reflection characteristics to the internal reflective structure may be in a range of 500 nm to 5 μm.

The plastic material may include polycarbonate (PC) or acrylonitrile butadiene styrene (ABS) copolymer.

The plastic material may include a pigment configured to render the housing in white or a near-white color.

The first funnels may each have a different shape depending on an allocated position.

The first funnels may each include a first-funnel input opening, a first-funnel output opening having a larger cross-sectional dimension than the first-funnel input opening, and a first-funnel light reflector structure configured to connect the first-funnel input opening and the first-funnel output opening. The first-funnel light reflector structure is shaped in consideration of a light emission pattern of the light sources so that the light intensity of the optical beams become homogeneous at the first-funnel output opening.

The first-funnel output opening may have a rectangular cross-section.

The first-funnel input opening may have a rectangular cross-section.

The first-funnel input opening may have a cross-sectional shape including four curves which are concave toward the corresponding light sources and allocated in a quadrangular arrangement.

The first-funnel input opening may have a cross-sectional shape including four curves which are convex away from the corresponding light sources and are allocated in a quadrangular arrangement.

The first-funnel light reflector structure may be formed by morphing a cross-sectional shape of the first-funnel input opening into a cross-sectional shape of the first-funnel output opening by a first scaling ratio.

The first scaling ratio may be a constant value.

The first scaling ratio may have a first profile that first decreases and then increases so that the first-funnel light reflector structure is convex in a front-rear direction when viewed from the corresponding light sources.

The first scaling ratio may have a second profile that first increases and then decreases so that the first-funnel light reflector structure is concave in the front-rear direction when viewed from the corresponding light sources.

The first-funnel light reflector structure may be configured to provide at least a partial collimating effect to light emitted from the first-funnel output opening by having the second profile in a parabolic profile forming a concave parabolic surface.

The housing may further include a display seating integrally molded with the housing to place the display unit in front of an output opening of the second funnel.

The housing may further include a diffuser sheet seating that is integrally formed between the display seating and the output opening of the second funnel and is configured to seat a diffuser sheet configured to reduce luminance unevenness of light incident on the display unit.

The housing may further include at least one printed circuit board engagement extending outwardly of the housing and configured to fasten the printed circuit board at the back of the housing.

According to another embodiment, the inventive concepts provides a picture generation unit (PGU) for use in a head-up display (HUD), including a printed circuit board, a display unit, and a housing. The printed circuit board includes a plurality of light sources. The display unit is disposed in front of the plurality of light sources and configured to form an image to be provided to the HUD. The housing is disposed between the printed circuit board and the display unit and includes an internal reflective structure configured to guide optical beams from the plurality of light sources to the display unit and to homogenize a light intensity of the optical beams incident on the display unit. The internal reflective structure includes a plurality of first funnels, respectively disposed corresponding to the plurality of light sources, and a second funnel disposed of as a singular funnel in front of the first funnels in a form encompassing the plurality of first funnels. The first funnels may each have a central optical axis in an arrangement rotated by a predetermined angle from a primary optical axis of the internal reflective structure arranged perpendicular to the printed circuit board; the predetermined angle is dependent on an allocated position of each of the first funnels.

At least a part of the second funnel may be formed in a parabolic mirror, and the plurality of first funnels may be configured to render the optical beams to be incident on the second funnel, the optical beams having a light pattern substantially equivalent to a light pattern from a single virtual light source disposed at a focal position of the parabolic mirror of the second funnel.

The housing may be made of a plastic material including polycarbonate (PC) or acrylonitrile butadiene styrene (ABS) copolymer and injection-molded from a material composed of titanium dioxide ($TiO_2$) microparticles dispersed in the plastic material.

The internal reflective structure may have specular reflection characteristics and diffuse reflection characteristics, which are controlled based on a size and a content rate of the $TiO_2$ microparticles included in the internal reflective structure.

The first funnels may each include a first-funnel input opening, a first-funnel output opening having a larger cross-sectional dimension than the first-funnel input opening, and a first-funnel light reflector structure configured to connect the first-funnel input opening and the first-funnel output opening. The first-funnel light reflector structure is shaped in consideration of a light emission pattern of the light sources so that the light intensity of the optical beams become homogeneous at the first-funnel output opening.

The first-funnel light reflector structure may be configured to have a parabolic profile formed into a concave parabolic surface when viewed from a central optical axis of each of the first funnels to provide at least a partial collimating effect to light emitted from the first-funnel output opening.

The internal reflective structure may be configured to have a predetermined surface roughness to provide diffuse reflection characteristics to light reflected from the light sources.

The display unit may be rectangular, and the first funnels may each have a central optical axis with an angular range of arrangement that includes a range of ±14 degrees in a long-side direction, and a range of ±6 degrees in a short-side direction, with respect to the primary optical axis.

The first funnels may each have a central optical axis with a positional range of arrangement determined based on an intersecting point of each of the central optical axis on a plane where the plurality of light sources are arranged, the positional range of arrangement being within 12 mm in the long-side direction, and within 14 mm in the short-side direction.

Each of the predetermined angles of the central optical axis of the first funnels may be arranged to be increased as the allocated position of each of the first funnels gets further away from the center of the plurality of light sources.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
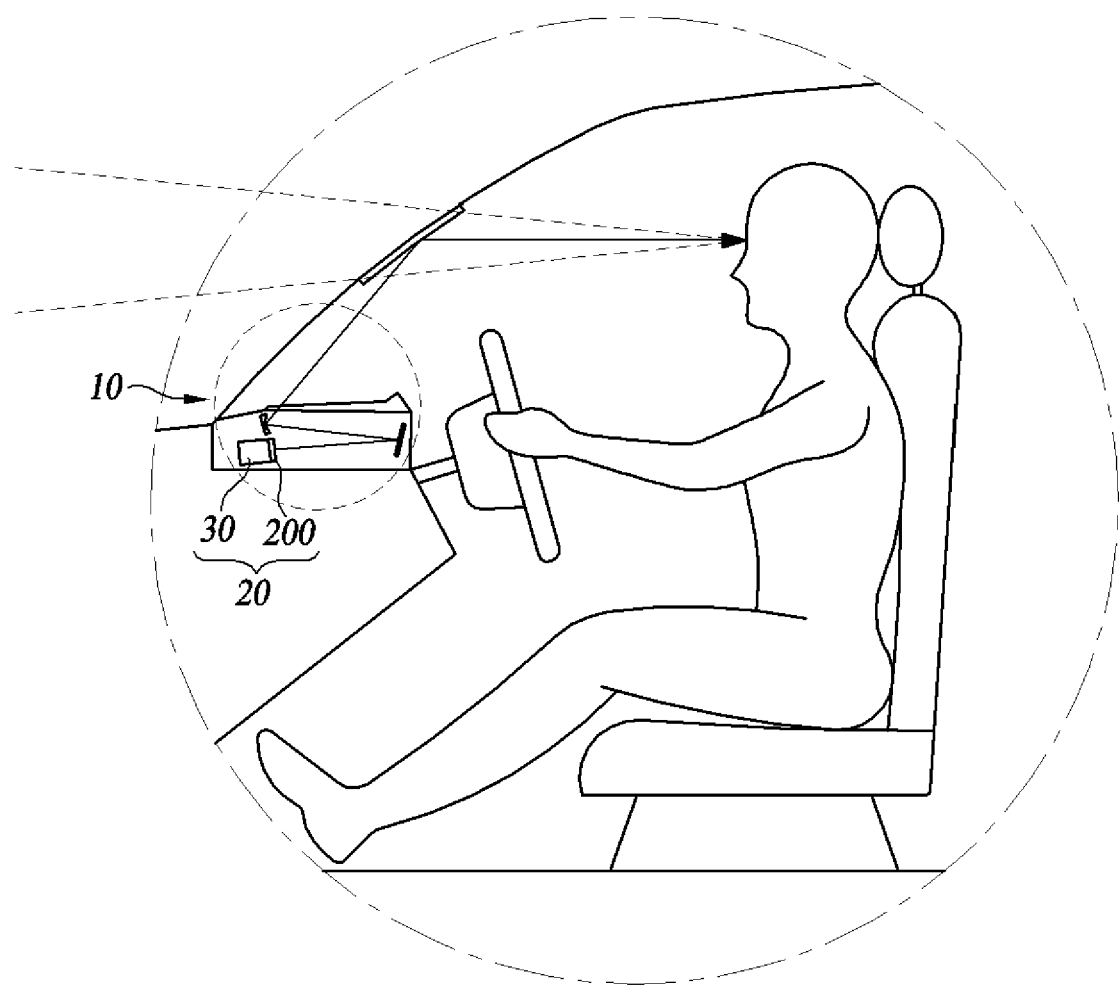
FIG. 1 is a conceptual diagram illustrating a typical vehicle HUD with a picture generation unit.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The inventive concepts as illustrated and described in embodiments herein provides a HUD picture generation unit (PGU), including a back-light unit (BLU), having a structural improvement capable of increasing the efficiency of utilizing light from light sources of the BLU and simplifying the configuration of the BLU.

Some embodiments of the inventive concepts are described below with reference to the accompanying drawings. In the following description, like reference numerals preferably designate like elements, although the elements are illustrated in different drawings. Further, in the following description of some embodiments, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto. The terms such as "unit," "module," and the like refer to units configured to process at least one function or operation, which may be implemented by hardware, software, or a combination thereof.

FIG. 1 is a conceptual diagram illustrating a typical vehicle HUD with a picture generation unit (PGU).

As illustrated in FIG. 1, a vehicle HUD 10 projects an optical image on a vehicle windshield or a separate screen so that the driver can see the same. The optical image of the HUD 10 is generated by the PGU 20 and is enlarged and projected through the internal optical system of the HUD 10. The PGU 20 includes an LCD 200 configured to generate an image to be projected on the screen and a BLU 30, which is placed behind the LCD 200 and is configured to provide light through the LCD 200 to project the optical image to the optical system of the HUD 10.

The BLU 30 is formed to illuminate the LCD 200 with light having a uniform distribution and an appropriate angular diffusion range of light. At least one embodiment of the inventive concepts relates to an optical structure included in the BLU 30. The optical structure may also serve as a housing 32 (illustrated in FIGS. 3 and 4) of the BLU 30. The optical structure may also have its front side formed to accommodate the LCD 200.

The PGU 20, according to at least one embodiment, includes the BLU 30 and the LCD 200 coupled to a front area of the BLU 30, from which light is emitted.

The BLU 30 according to at least one embodiment includes a plurality of light sources (not illustrated), a printed circuit board (PCB) having one surface on which the plurality of light sources are disposed, a housing 32 that is an optical structure and has a rear area coupled to the one surface of the PCB, and a diffuser sheet (not illustrated) accommodated in a front area of the housing 32.

The light source of the BLU 30 may be an LED light source. The PCB may have a heat dissipation structure (not illustrated) disposed on the other surface.

Figure 2A:
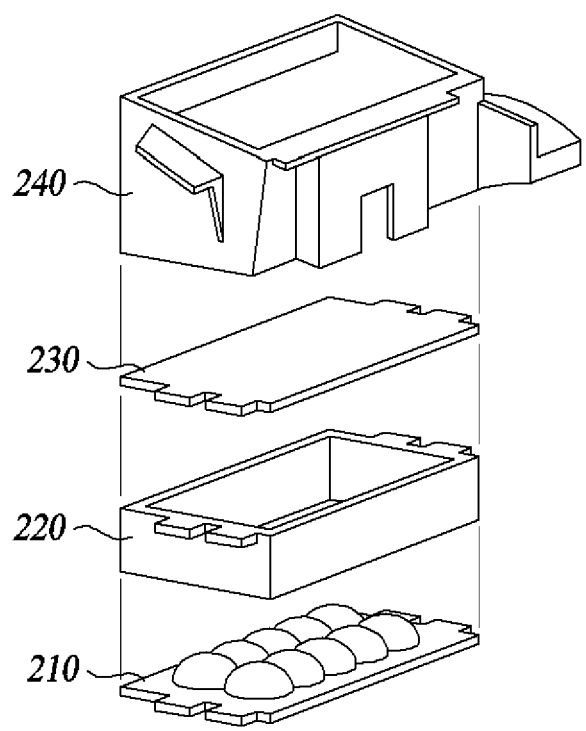
FIG. 2 are exploded perspective views illustrating the structure of a typical picture generation unit of a vehicle HUD.
Figure 2B:
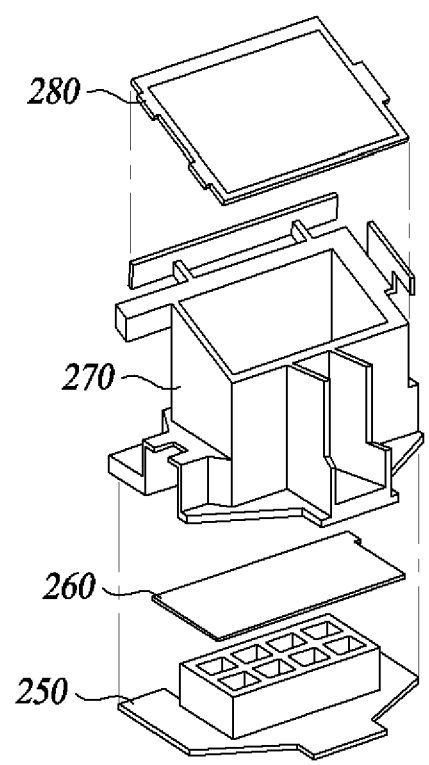

FIGS. 2(a) and 2(b) are exploded perspective views illustrating the structure of different PGUs of a vehicle HUD.

In a PGU, the BLU may include an appropriate optical structure so that optical beams from a plurality of LEDs are homogeneously irradiated with a constant light intensity behind a LCD housing. FIG. 2(a) includes housing structure 220 and 240. FIG. 2(b) includes housing structure 270. In FIG. 2(a), an optical structure may include a lens array 210. In FIG. 2(b) an optical structure may include a funnel array. A prism sheet such as a brightness enhancement film (BEF) (not illustrated), a dual brightness enhancement film (DBEF) 260, and a diffuser sheet (not illustrated) may be used. These components also serve to limit the angular diffusion range of light incident behind the LCD to within an effective range. The effective range corresponds to the optical image area of the screen, which is at the final projection position of the optical image.

When the lens array 210 is used, an optical loss may occur at the interface of the lens array 210. In the case of the funnel array 250, the optical loss may be small, but the manufacturing cost for forming a reflective coating inside the funnel is high. A Fresnel lens 230 may be used in the PGU of FIG. 2(a) to focus light emitted from the lens array 210. In FIG. 2(b), a Fresnel lens plus diffuser 280 may be used to focus light output from the funnel array 250. The prism sheet may be used to control the angular diffusion range of light. However, the use of a prism sheet increases the manufacturing cost of the BLU.

Figure 3A:
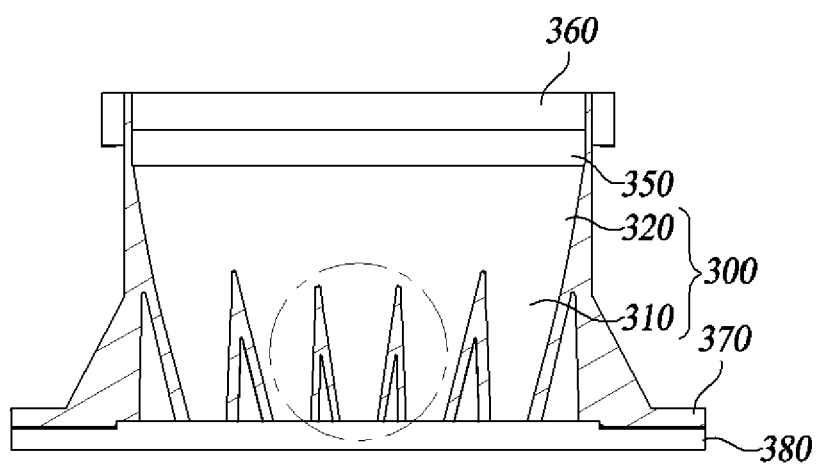
FIG. 3 is a long-side or longitudinal cross-sectional view and a partially enlarged view illustrating an optical structure according to at least one embodiment of the inventive concepts.
Figure 3B:
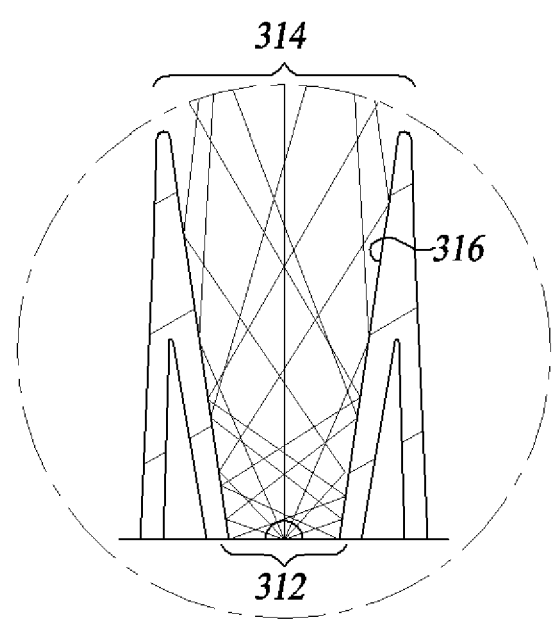

FIG. 3 is a long-side or longitudinal cross-sectional view and a partially enlarged view illustrating an optical structure according to at least one embodiment of the inventive concepts.

Figure 4A:
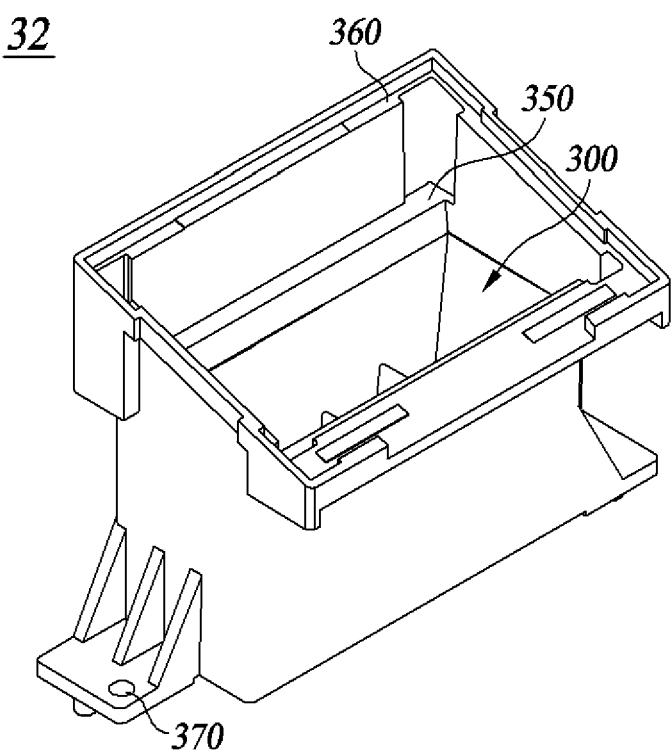
FIGS. 4A and 4B are a perspective view and a plan view illustrating an optical structure according to at least one embodiment of the inventive concepts.
Figure 4B:
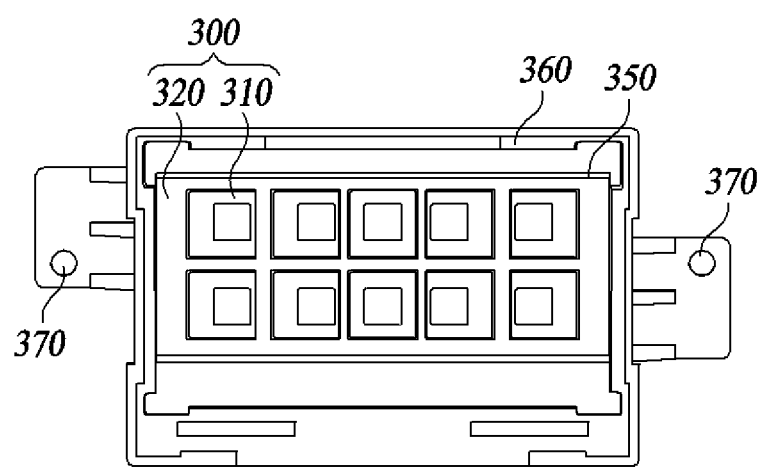

FIGS. 4(a) and 4(b) are a perspective view and a plan view illustrating an optical structure according to at least one embodiment of the inventive concepts.

As illustrated in FIG. 3, an interior of the housing 32 is formed of an internal reflective structure 300 having a bi-level structure. For the convenience of description, a light source side is referred to as a first level, and the LCD 200 side is referred to as a second level. The light source on the one surface of a PCB 380 is arranged to emit light into the internal reflective structure 300. The internal reflective structure 300 formed inside the housing 32 according to at least one embodiment may be in the form of a double-funnel reflector formed with a plurality of first funnels 310 on the first level and a singular second funnel 320, being formed to encompassing all of the first funnels 310, on the second level.

The housing 32 may be manufactured by injection molding using plastic material such as polycarbonate (PC) or acrylonitrile butadiene styrene (ABS) copolymer. The material of the housing 32 may be added with a pigment to render a white color or a color close to white to improve light reflection.

In particular, the plastic material configured to manufacture the housing 32, according to at least one embodiment, may be a material in which titanium dioxide ($TiO_2$) microparticles are dispersed. The size and the content rate of the $TiO_2$ microparticles in the plastic material may be selected to have appropriate light reflectance and/or reflection characteristics on the inner side of the housing 32, which provides the internal reflective structure 300.

The housing 32, according to at least one embodiment, is formed with the light reflection characteristics of the inner surfaces of the first and second funnels 310 and 320 determined by injection molding of a plastic material in which $TiO_2$ microparticles are dispersed. Therefore, the housing 32 may not form a separate reflective coating for light reflection on the inner surfaces of the first and second funnels 310 and 320. In other words, the light reflection characteristics of the internal reflective structure 300 may be adjusted by the particle size and the content rate of the $TiO_2$ microparticles. Here, the light reflection characteristic includes regular reflection or specular reflection, in which the reflection is mirror reflection and diffuse reflection through which the reflected light is diffused.

The main reflection characteristics of the surface containing $TiO_2$ may be classified according to whether the particle size is larger or smaller than the size of half a wavelength of visible light. In particular, with a size of 200 to 350 nm, which is half of the visible wavelength of 400 to 700 nm used as a reference, a size smaller than the reference size, e.g., 100 nm or less renders the specular reflection characteristics to be dominant. Larger size, e.g., in the range of 500 nm to 5 µm, render the diffuse reflection characteristics to dominate.

Even when the $TiO_2$ microparticles are prepared in a size of 200 to 350 nm, agglomeration or the like in the process of forming the microparticles may include those having a large unit particle size and widen the distribution of the microparticle sizes. The housing 32, according to at least one embodiment, may control light reflection characteristics of the inner surfaces of the first and second funnels 310 and 320 by selecting and using such a material in which the $TiO_2$ microparticles are dispersed by a size that is within an appropriate range. To select the size of the microparticles may utilize sifting as commonly known or other methods.

Meanwhile, the light reflection characteristics of the inner surfaces of the first and second funnels 310 and 320 may be adjusted by modifying the surface roughness of the injection mold, through surface finishing after injection molding, or by using other methods in at least one embodiment, while using the $TiO_2$ microparticles having a size in the range of 200 to 350 nm. The double-funnel reflector structure in at least one embodiment may be manufactured by injection molding of a plastic material such as PC or ABS without including $TiO_2$ microparticles and may be formed to have an intended surface roughness as desired, with the internal reflective structure thereof coated with metal to increase the light reflection efficiency.

Assuming an ideal case, the radiation of light from the chip face of the LED has a Lambertian radiation pattern. In most commercial LED light sources, the radiation pattern of light is adjusted to the intended form by a waveguide in the LED device or a microstructure that acts as a lens disposed on the device. The light radiation pattern of the LED light source may have a different pattern for each manufacturer. For example, the radiation pattern of the LED light source may have various shapes such as hot air balloon shape, cocoon shape, cone shape, an ellipsoid shape, among others.

The contours of the first and second funnels 310 and 320 of the internal reflective structure 300, according to at least one exemplary embodiment, are designed in consideration of a light radiation pattern of a commercial LED light source used. In particular, the structure of the plurality of first funnels 310 disposed of adjacent to the LED light sources below the funnels may be designed in various forms taking account of the light radiation pattern of the LED light sources.

Each first funnel 310 is formed in a structure including an input opening 312, an output opening 314, and a light reflector structure 316 between the input opening 312 and the output opening 314. Similarly, the second funnel 320 is also formed in a structure including an input opening, an output opening, and a light reflector structure therebetween. The plurality of output openings 314 of the first funnel 310 are a plurality of input openings of the second funnel 320.

The first-funnel input openings 312 are each formed corresponding to each of LED light sources disposed on a printed circuit board 380 underlying the first funnel input openings 312. The first-funnel input opening 312 is formed to be larger than the corresponding LED light sources. The center of the first-funnel input opening 312 may be located to coincide with that of the corresponding LED light sources. The output specification of the LED light sources and the number and layout of the LED light sources disposed on the printed circuit board 380 may be determined by taking into account the light intensity used by the HUD 10, the size of the LCD 200, and the like.

The overall contour of the plurality of first-funnel output openings 314 is made such that the rim shape thereof corresponds to the second-funnel input opening. Therefore, the whole outer shape made by the plurality of first-funnel output openings 314 is seamlessly connected to the second-funnel input opening.

The second-funnel output opening is formed to correspond to the image area of the LCD 200.

A diffuser sheet seating 350 may be formed in the form of a stepped portion outside the second-funnel output opening. An LCD seating 360 may be formed outside the diffuser sheet seating 350.

The internal reflective structure 300 having a double-funnel structure including the first and second funnels 310 and 320 according to at least one embodiment guides each optical beam from each LED light source through each of the first funnels 310 to the second funnel 320 wherein the plurality of optical beams that have passed through the plurality of first funnels 310 are combined and, after passing through the diffuser sheet seating 350, they are incident on the LCD seating 360 and the rear of the LCD 200.

The housing 32 may be externally formed with printed circuit board fastening portions 370 configured to couple the housing 32 with the printed circuit board.

The housing 32 according to at least one embodiment includes a plurality of first funnels 310 on the light source side, a singular second funnel 320 on the LCD 200 side, the diffuser sheet seating 350 between and the second-funnel output opening and the LCD 200, and the LCD seating 360 in front of the diffuser sheet seating 350. In addition, the housing 32 may include printed circuit board fastening portions 370 at external portions thereof.

According to at least one embodiment, the visible light region of the inner surfaces of the first and second funnels 310 and 320 may be formed to have a reflectance of 60% or more. Preferably, the inner surfaces of the first and second funnels 310 and 320 may be formed to include both characteristics of a specular reflection surface and a diffuse reflection surface.

As described above, the contours of the first and second funnels 310 and 320 may be designed in consideration of the light radiation pattern of the LED light source used and the surface reflection characteristics of the inner surfaces of the first and second funnels 310 and 320.

For example, through computational simulation such as the Monte-Carlo optical ray-tracing method, the first and second funnels 310 and 320 may be contoured to provide the angular diffusion range of light used for the BLU 30 and the light homogeneity in the image area of the LCD 200 among other characteristics.

The inventive concepts provide a configuration in which the optical beams emitted from the plurality of LED light sources pass through the first and second funnels 310 and 320, and the diffusely reflected light and the specularly reflected light are mixed, so that the mixed light is incident behind the LCD 200 in the form of flat light having a substantially rectangular cross-section similar to the LCD 200 and a homogeneous light intensity.

The BLU 30 according to at least one embodiment is formed into the internal reflective structure 300 having a double-funnel structure including the first and second funnels 310 and 320 formed to provide the characteristics of the light homogeneity and appropriate angular diffusion range of light, whereby obviating the use of a prism sheet, resulting in a simple configuration including only the diffuser sheet seating 350.

On the other hand, a most basic shape of the first and second funnels 310 and 320 according to at least one embodiment is the input opening and the output opening which are rectangular and the light reflector structure in which the quadrangular cross-section is expanded and extended from the input opening to the output opening. In addition, the cross-sectional shape of the emitted light is desired to be in a rectangular shape conforming to the shape of the LCD 200.

However, the light from the LED light sources normally cannot maintain a rectangular light cross-section perpendicular to the light traveling direction in the light paths extending from the first-funnel input openings 312 to the second-funnel output opening. This is because even if the LED light source is formed in a rectangular shape, the optical beams emitted therefrom are radiated 360 degrees omnidirectionally from the respective local light starting points to have a Lambertian radiation pattern as described above.

The Lambertian radiation pattern has a Gaussian distribution in which the density of the light cross-section is highest along the central axis of the light and decreases toward the periphery. For example, the light radiation pattern may exhibit a distribution in which 90% of the luminous intensity is concentrated in the range of ±20 degrees, and 50% of the luminous intensity is included in the range of ±60 degrees with respect to the primary optical axis in front of the light sources. The three-dimensional distribution of the light density for the area in front of the LED light sources may differ for each type of LED light source used.

The cross-sectional profiles perpendicular to the front-rear direction of the first and second funnels 310 and 320 and the contours of the light reflector structure of the first and second funnels 310 and 320 according to at least one embodiment are formed to have shapes other than a square cross-sectional shape to improve the homogeneity of light incident on the image area of the LCD 200.

Although not illustrated, for example, the first-funnel input opening 312 may have a basic quadrangular shape with a curvature, which has each side being concave toward the center of the quadrangle. In other words, the first-funnel input opening 312 may have a cross-sectional shape made of four concave curves, each having a central portion close to the central optical axis of the light source and collectively arranged into a quadrangular shape.

The first-funnel output opening 314 may have a similar shape. However, the first-funnel output opening 314 may have a smaller degree of concave entry of each side when compared to the first-funnel input opening 312. At this time, the reflective surfaces of the first-funnel light reflector structure 316 connecting the first-funnel input opening 312 and the first-funnel output opening 314 would be not planar but curved and convex toward the central axis of the first funnel 310.

In this case, the three-dimensional light pattern having a Lambertian radiation pattern from the LED light sources is specularly reflected and diffusely reflected by the reflective surfaces of the first-funnel light reflector structure 316, which are in the form of convex curved surfaces, so that the light cross-section having a homogeneous light density at the first funnel exit opening 314 may be derived from a circular cross-section into a square cross-section. Of the surface reflection characteristics, the specular reflection characteristic will determine the overall light pattern, and the diffuse reflection characteristic will contribute to light intensity averaging by spreading the reflected light.

The input opening of the second funnel 320 may correspond to the shape formed by the plurality of first-funnel output openings 314, and the output opening of the second funnel 320 may correspond to the shape of the LCD 200. The second-funnel light reflector structure may have concave reflective surfaces configured to allow light incident on the LCD 200 is substantially perpendicular to the rear surface of the LCD 200.

The above-described embodiment is merely an example, and the detailed structure of the first and second funnels 310 and 320 can be in various forms in consideration of a light radiation pattern of the LED light sources used and the surface reflection characteristics of the first and second funnels 310 and 320. It can be optimized through computational simulation.

Thus, rather than superpositioning a plurality of cross-sectionally circular light patterns to form a single homogeneous square light pattern, it is determined to superpose a plurality of cross-sectionally rectangular light patterns onto each other to ensure homogeneity of the light pattern. Therefore, because the cross-sectional pattern of light is guided into a rectangular shape by the plurality of first funnels 310 having the modified cross-sectional shape, the plurality of light patterns combined by the second funnel 320 can secure the homogeneity of the light density more easily.

As another embodiment, the cross-sectional shape of the first-funnel input opening 312 may be quadrangular, while having a curved shape in which each side is convex outward from the center of the quadrangle. In other words, the first-funnel input opening 312 may have a cross-sectional shape made of four convex curves, each having a central portion far from the central optical axis of the light source and collectively arranged into a quadrangular shape.

The first-funnel light reflector structure 316, according to at least one embodiment, may also be configured to limit the angular diffusion range of light and to further incorporate a specific shape in the front-rear direction of the structure 316 to provide directivity or collimating effect to the light incident behind the LCD 200.

The first-funnel light reflector structure 316, according to at least one embodiment, is formed by the cross-sectional profile of the first-funnel input opening 312 morphed at a first scaling ratio into the cross-sectional profile of the first-funnel output opening 314. Here, 'morph' refers to that the cross-sectional profile of the first-funnel input opening 312 changes continuously into that of the first-funnel output opening 314 along the front-rear extension of the first-funnel light reflector structure 316. For example, where the first-funnel input opening 312 has four concave sides and the first-funnel output opening 314 has a rectangular cross-sectional profile, the concave cross-section of the first-funnel light reflector structure 316 may gradually expand toward the front from the first-funnel input opening 312 and become four straight sides at the first-funnel output opening 314.

In this case, when the first scaling ratio is constant, the reflective surfaces of the first-funnel light reflector structure 316 may be formed by morphing and expanding the cross-sectional shape of the first-funnel input opening 312 to a certain degree in the front-rear direction.

As yet another embodiment, with the first scaling ratio having a first profile that first decreases and then increases, the first-funnel light reflector structure 316 may be convex in the front-rear direction when viewed from the light sources.

As yet another embodiment, with the first scaling ratio having a second profile that first increases and then decreases, the first-funnel light reflector structure 316 may be concave in the front-rear direction when viewed from the light sources.

In yet another embodiment, the second profile has a parabolic profile. The first-funnel light reflector structure 316 as formed accordingly constitutes parabolic surfaces that are concave in the front-rear direction and thereby serves to provide the collimating effect at least partially to the light emitted from the first-funnel output opening 314 or enhance the directionality of the light emitted from the first-funnel output opening 314.

On the other hand, an internal reflective structure 400 according to another embodiment of the inventive concepts may include a plurality of first funnels 410 and a single second funnel 420, wherein at least some of the first funnels 410 may have their optical axes inclined with respect to the primary optical axis of the entire internal reflective structure 400.

Figure 5A:
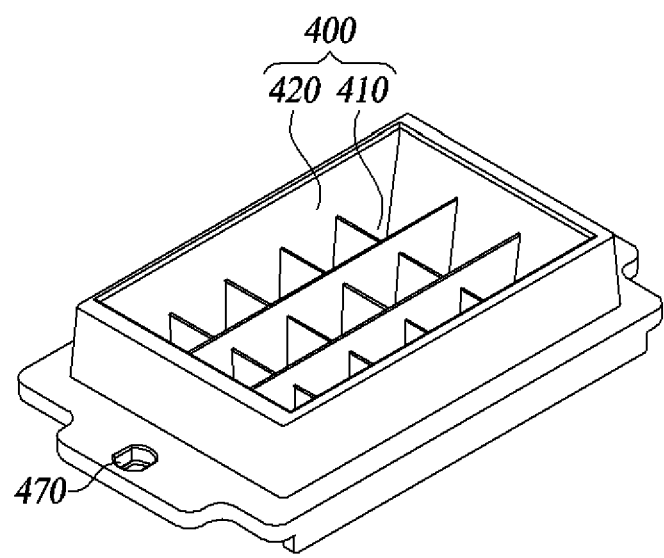
FIGS. 5A and 5B are a perspective view and a plan view illustrating a housing, which is an optical structure according to another embodiment of the inventive concepts.
Figure 5B:
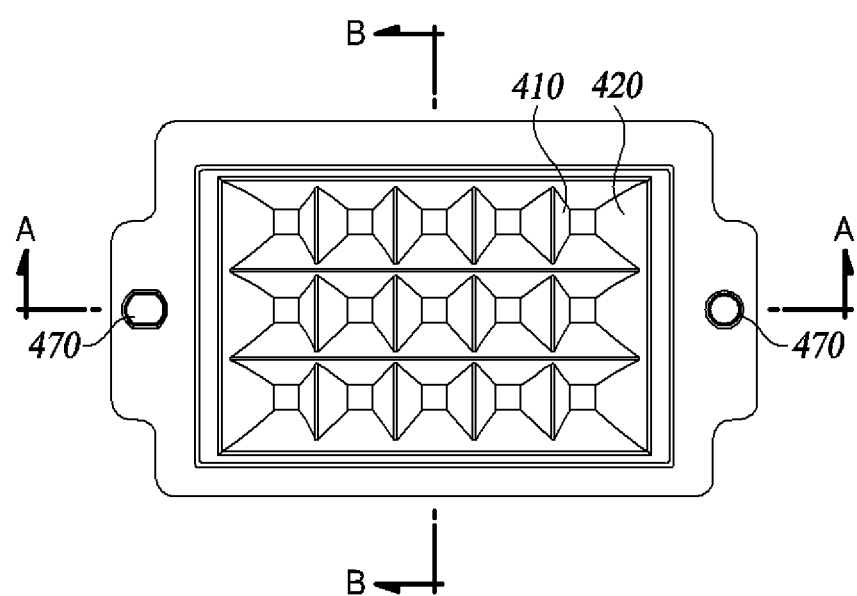

FIGS. 5(a) and 5(b) are a perspective view and a plan view of a housing, which is an optical structure according to another embodiment of the inventive concepts.

Figure 6A:
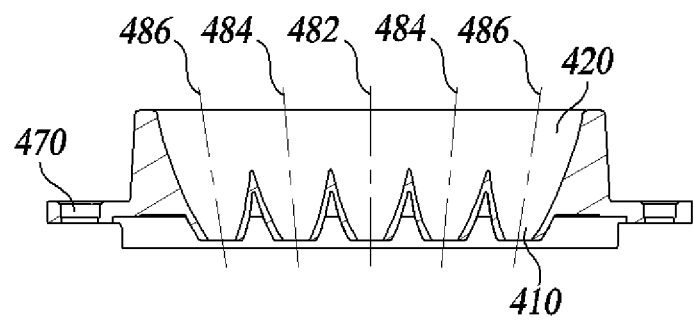
FIGS. 6A and 6B are a long-side or longitudinal sectional view and a short-side or latitudinal sectional view illustrating an organization of optical axes of an internal reflective structure according to another embodiment of the inventive concepts.
Figure 6B:
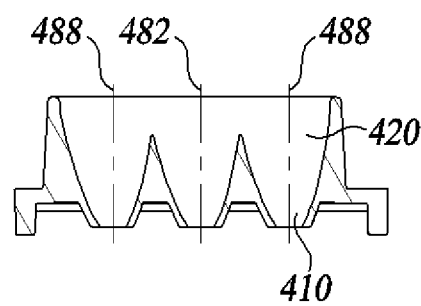

FIGS. 6(a) and 6(b) are a longitudinal sectional view and a latitudinal sectional view illustrating an organization of optical axes of an internal reflective structure according to another embodiment of the inventive concepts.

As illustrated in FIGS. 5(a) to 6(b), in the internal reflective structure 400 according to at least one embodiment, the plurality of first funnels 410 each have a central optical axis arranged in the long-side or longitudinal direction and an arrangement tilted by an angle from the primary optical axis of the internal reflective structure 400, the angle incrementing away from the center of all the first funnels 410.

The LCD 200, which is a display unit, typically has a rectangular shape, and the corresponding BLU 30 is also formed in a rectangular shape. The present embodiment illustrates a group of five light sources 405 arranged in the long-side direction, and the correspondingly formed five first funnels 410. The first funnels 410 at the center has its central optical axis arranged parallel to a primary optical axis 482. The farther the remaining first funnels 410 are disposed of away from the center first funnel 410, the more the central optical axes 484 and 486 thereof are inclined away from the primary optical axis 482. In FIG. 5 and FIG. 6(a) printed circuit board fastening portions 470 are provided to couple the housing thereof to a printed circuit board.

FIG. 6(b) illustrates a group of three light sources arranged in the short-side direction. In the illustrated embodiment, the central optical axes of the first funnels 410 are parallel to the primary optical axes 482 and 488 in the short-side direction. However, as illustrated in FIG. 6(a), the first funnels 410 disposed outwardly of the center first funnel 410 may be configured to have their central optical axes inclined further outward from the primary optical axis.

A second funnel 420 may be formed to render the optical beams incident from the plurality of first funnels 410 to be homogeneously combined and to allow the light transmitted to the LCD 200 to have an appropriate angular diffusion range of light.

In at least one embodiment, an angular range of arrangement of the central optical axis of each of the first funnels 410 is within a range of ±14 degrees in a long-side direction and a range of ±6 degrees in a short-side direction, with respect to the primary optical axes. In at least one embodiment, the positional range of arrangement of the central optical axis of each of the first funnels 410 is within 12 mm in the long-side direction and within 14 mm in the short-side direction based on an intersecting point of each of the central optical axis on a plane where the plurality of light sources are arranged.

Such an angular range of arrangement and positional range or arrangement may be selected in consideration of an angular diffusion range of light and the homogeneity of light incident on the LCD 200 from the output opening of the second funnel 420.

A structure including the plurality of first funnels 410 having different central optical axes 482, 484, 486, 488 according to at least one embodiment can easily reduce the front-rear height of the internal reflective structure 400 including the first and second funnels 410.

It is well known that the reflected light from a single light source placed at the focal point of a parabolic mirror having a parabolic surface obtained by being rotated a parabola around its axis emits light forward in a collimated manner.

There is a desire to display the HUD 10 with a high level of light intensity that is easy to be identified even under daylight. To provide such high light intensity from a single light source may pose a problem with a high level of heat generation there. To control the heat generation of the light source to an appropriate level or less, one consideration is to use an arrangement of multiple light sources. However, multiple light sources, which are widely disposed on a planar printed circuit board and having a central optical axis in a direction perpendicular to the printed circuit board, even if their emitted optical beams are reflected on a single parabolic surface, they could not easily secure collimation characteristics or directivity. On the other hand, the inventive concepts in at least one embodiment may be configured that the central axis of each first funnel 410, disposed forwardly of a plurality of light sources, is tilted respectively according to the allocated position of each first funnel 410, thereby providing a light emission pattern to the second funnel 420 similar to that could be generated by a single light source otherwise disposed further behind the plurality of light sources.

The internal reflective structure 400 according to at least one embodiment can have a greatly reduced height, measured in the front-rear direction, by incorporating the plurality of first funnels 410 specifically formed to provide a light emission pattern to the second funnels 420, similar to that could be generated by a single light source otherwise disposed at the parabolic focal position of the second funnel 420, with a plurality of light sources disposed forwardly of the same parabolic focal position of the second funnel 420.

The inventive concepts in some embodiments forms an optical structure among the back-light unit (BLU) components of the picture generation unit (PGU) that provides an image to the HUD into a double-funnel reflector structure, thereby improving the efficiency of using light from the light sources of the BLU and simplifying the configuration of the BLU while effecting reduced manufacturing cost of the PGU.

Although exemplary embodiments of the inventive concepts have been described for illustrative purposes, those skilled in the art will appreciate that various modifications, additions, and substitutions are possible, without departing from the idea and scope of the claimed invention. Therefore, exemplary embodiments of the inventive concepts have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A picture generation unit (PGU) for use in a head-up display (HUD), the picture generation unit comprising:
   a printed circuit board including a plurality of light sources;
   a display unit disposed in front of the plurality of light sources and configured to form an image to be provided to the HUD; and
   a housing disposed between the printed circuit board and the display unit and comprising an internal reflective structure configured to guide optical beams from the plurality of light sources to the display unit, and to homogenize a light intensity of the optical beams incident on the display unit, wherein the internal reflective structure comprises:
   a plurality of first funnels respectively disposed corresponding to the plurality of light sources; and
   a second funnel disposed as a singular funnel in front of the plurality of first funnels in a form encompassing the plurality of first funnels,
   wherein the housing is manufactured by injection molding using a plastic material dispersed with titanium dioxide ($TiO_2$) microparticles, and
   wherein internal reflective structure includes $TiO_2$ microparticles and has specular reflection characteristics and diffuse reflection characteristics which are controlled based on a size and a content rate of the $TiO_2$ microparticles.

2. The picture generation unit of claim 1, wherein the size of the $TiO_2$ microparticles configured to provide the specular reflection characteristics to the internal reflective structure is in a range of 200 nm to 300 nm.

3. The picture generation unit of claim 1, wherein the size of the $TiO_2$ microparticles configured to provide the diffuse reflection characteristics to the internal reflective structure is in a range of 500 nm to 5 μm.

4. The picture generation unit of claim 1, wherein the first funnels each have a different shape depending on an allocated position.

5. The picture generation unit (PGU) of claim 1,
   wherein the first funnels each comprise:
   a first-funnel input opening;
   a first-funnel output opening having a larger cross-sectional dimension than the first-funnel input opening; and
   a first-funnel light reflector structure configured to connect the first-funnel input opening and the first-funnel output opening,
   wherein the first-funnel light reflector structure is shaped in consideration of a light emission pattern of the light sources so that the light intensity of the optical beams becomes homogeneous at the first-funnel output opening.

6. The picture generation unit of claim 5, wherein the first-funnel output opening has a rectangular cross-section.

7. The picture generation unit of claim 5, wherein the first-funnel input opening has a rectangular cross-section.

8. The picture generation unit of claim 5, wherein the first-funnel input opening has a cross-sectional shape comprising:
   four curves which are concave toward the corresponding light sources and allocated in a quadrangular arrangement.

9. The picture generation unit of claim 5, wherein the first-funnel input opening has a cross-sectional shape comprising:
   four curves which are convex away from the corresponding light sources and are allocated in a quadrangular arrangement.

10. The picture generation unit of claim 5, wherein the first-funnel light reflector structure is formed by morphing a cross-sectional shape of the first-funnel input opening into a cross-sectional shape of the first-funnel output opening by a first scaling ratio.

11. The picture generation unit of claim 10, wherein the first scaling ratio is a constant value.

12. A picture generation unit (PGU) for use in a head-up display (HUD), the picture generation unit comprising:
    a printed circuit board including a plurality of light sources;
    a display unit disposed in front of the plurality of light sources and configured to form an image to be provided to the HUD; and
    a housing disposed between the printed circuit board and the display unit and comprising an internal reflective structure configured to guide optical beams from the plurality of light sources to the display unit, and to homogenize a light intensity of the optical beams incident on the display unit, wherein the internal reflective structure comprises:
    a plurality of first funnels respectively disposed corresponding to the plurality of light sources; and
    a second funnel disposed as a singular funnel in front of the plurality of first funnels in a form encompassing the plurality of first funnels,
    wherein the first funnels each comprise:
    a first-funnel input opening;
    a first-funnel output opening having a larger cross-sectional dimension than the first-funnel input opening; and
    a first-funnel light reflector structure configured to connect the first-funnel input opening and the first-funnel output opening,
    the first-funnel light reflector structure is shaped in consideration of a light emission pattern of the light sources so that the light intensity of the optical beams become homogeneous at the first-funnel output opening, and
    wherein the first-funnel light reflector structure is formed by morphing a cross-sectional shape of the first-funnel input opening into a cross-sectional shape of the first-funnel output opening by a first scaling ratio, and
    wherein the first scaling ratio has a first profile that first decreases and then increases so that the first-funnel light reflector structure is convex in a front-rear direction when viewed from the corresponding light sources.

13. A picture generation unit (PGU) for use in a head-up display (HUD), the picture generation unit comprising:
    a printed circuit board including a plurality of light sources;
    a display unit disposed in front of the plurality of light sources and configured to form an image to be provided to the HUD; and
    a housing disposed between the printed circuit board and the display unit and comprising an internal reflective structure configured to guide optical beams from the plurality of light sources to the display unit, and to homogenize a light intensity of the optical beams incident on the display unit, wherein the internal reflective structure comprises:
a plurality of first funnels respectively disposed corresponding to the plurality of light sources; and
a second funnel disposed as a singular funnel in front of the plurality of first funnels in a form encompassing the plurality of first funnels,
wherein the first funnels each comprise:
a first-funnel input opening;
a first-funnel output opening having a larger cross-sectional dimension than the first-funnel input opening; and
a first-funnel light reflector structure configured to connect the first-funnel input opening and the first-funnel output opening,
the first-funnel light reflector structure is shaped in consideration of a light emission pattern of the light sources so that the light intensity of the optical beams become homogeneous at the first-funnel output opening, and
wherein the first-funnel light reflector structure is formed by morphing a cross-sectional shape of the first-funnel input opening into a cross-sectional shape of the first-funnel output opening by a first scaling ratio, and
wherein the first scaling ratio has a profile that first increases and then decreases so that the first-funnel light reflector structure is concave in a front-rear direction when viewed from the corresponding light sources.

14. The picture generation unit of claim 13, wherein the first-funnel light reflector structure is configured to provide at least a partial collimating effect to light emitted from the first-funnel output opening by having the second profile in a parabolic profile forming a concave parabolic surface.

15. The picture generation unit of claim 1, wherein the housing further comprises:
a display seating integrally molded with the housing to place the display unit in front of an output opening of the second funnel.

16. The picture generation unit of claim 15, wherein the housing further comprises:
a diffuser sheet seating that is integrally formed between the display seating and the output opening of the second funnel and is configured to seat a diffuser sheet configured to reduce a luminance unevenness of light incident on the display unit.

17. The picture generation unit of claim 15, wherein the housing further comprises:
at least one printed circuit board fastening portion extending outwardly of the housing and configured to fasten the printed circuit board at the back of the housing.

* * * * *